United States Patent
Sone et al.

(10) Patent No.: US 7,672,585 B2
(45) Date of Patent: Mar. 2, 2010

(54) OPTICAL SWITCH SYSTEM

(75) Inventors: Kyosuke Sone, Kawasaki (JP); Yasuhiko Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 645 days.

(21) Appl. No.: 11/536,326

(22) Filed: Sep. 28, 2006

(65) Prior Publication Data

US 2007/0223921 A1  Sep. 27, 2007

(30) Foreign Application Priority Data

Mar. 24, 2006 (JP) .............................. 2006-084047

(51) Int. Cl.
*H04J 14/00* (2006.01)

(52) U.S. Cl. .............................. 398/45; 398/75; 398/98; 398/12; 398/99; 398/102; 398/19; 398/23; 398/35; 398/38; 398/183; 385/24; 385/37; 385/16; 385/17; 385/18

(58) Field of Classification Search .................. 398/79, 398/83, 33, 45, 177, 38, 82, 30, 37, 48, 46, 398/47, 50, 51, 54, 94, 158, 159, 160, 162, 398/181, 10, 12, 17, 19, 22, 23, 24, 34, 35, 398/52, 53, 75, 98, 99, 100, 102, 161, 154, 398/182, 183, 185, 186, 192, 195, 197, 200, 398/201; 385/24, 37, 16, 17, 18
See application file for complete search history.

(56) References Cited

U.S. PATENT DOCUMENTS

| 6,404,525 | B1 * | 6/2002 | Shimomura et al. | 398/82 |
| 6,449,068 | B1 * | 9/2002 | Turner et al. | 398/38 |
| 7,295,775 | B2 * | 11/2007 | Bisson et al. | 398/33 |
| 2003/0099475 | A1 * | 5/2003 | Nemoto et al. | 398/83 |

OTHER PUBLICATIONS

Ken Morito, Member, IEEE, "Output-Level Control of Semiconductor Optical Amplifier by External Light Injection", Journal of Lightwave Technology, vol. 23, No. 12 pp. 4332-4341., 2005.

* cited by examiner

*Primary Examiner*—Hanh Phan

(57) ABSTRACT

Each of a plurality of semiconductor optical amplifiers operates as an optical gate switch and selects an optical signal indicated by a gate control signal from an optical gate switch control unit. A plurality of photodetectors monitor the power of an optical signal input through a corresponding input port. A VOA control unit calculates an amount of attenuation corresponding to each input port based on the power of each optical signal. A variable optical attenuator attenuates the selected optical signal according to the calculated amount of attenuation in synchronization with the gate control signal.

10 Claims, 11 Drawing Sheets

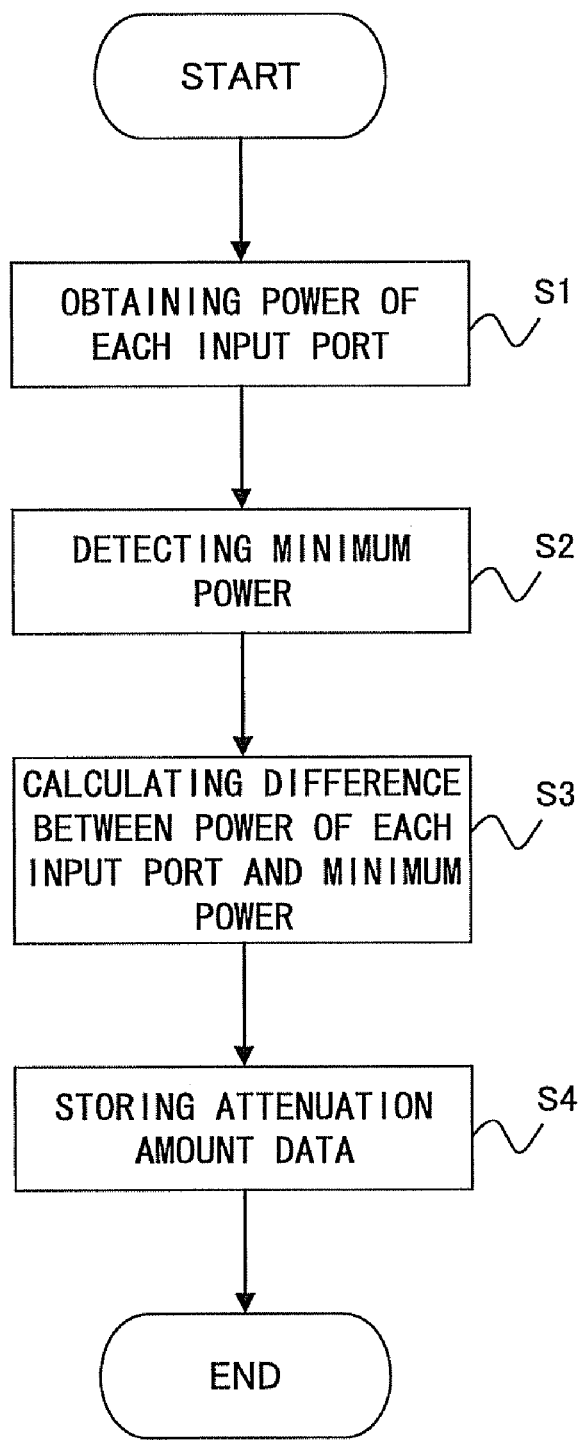
F I G. 8

FIG. 9A

| INPUT PORT | OPTICAL POWER (dBm) |
| --- | --- |
| #1 | −5.5 |
| #2 | −5.7 |
| #3 | −6.0 |
| #4 | −5.2 |

FIG. 9B

| INPUT PORT | AMOUNT OF ATTENUATION (dB) |
| --- | --- |
| #1 | 0.5 |
| #2 | 0.3 |
| #3 | 0 |
| #4 | 0.8 |

OPTICAL SWITCH SYSTEM

BACKGROUND OF THE INVENTION

1. Field of the Invention

The present invention relates to an optical switch system provided with a plurality of input ports and a plurality of output ports, and more specifically to an optical packet switch system for switching an optical packet input through an arbitrary input port to an arbitrary output port.

2. Description of the Related Art

Conventionally, metal wiring has been used for a connection between devices (for example, for communications between computers), a connection between boards (for example, for communications between printed circuit boards), and a connection between elements in a board (for example, for communications between elements in a printed circuit board). However, in metal wiring, there is a problem of a transmission loss or restrictions of a transmission band. The speed of the evolution in an LSI chip including a CPU greatly exceeds the speed of the evolution of the high-speed technology of electric wiring. Therefore, in a system using electric wiring, the processing speed of an LSI cannot efficiently work. Additionally, with the remarkable improvement of the capacity of LSI chips, the number of input/output pins provided for an LSI has reached several hundreds or thousands. Therefore, it has been difficult to connect an LSI having such a large number of input/output pins with metal wiring.

Recently, optical interconnect technology has received attention as a breakthrough for solving the problem (wiring bottleneck) about the metal wiring. An optical interconnect generally refers to the optical data communications for a very short distance, and commonly indicates optical communication for a distance shorter than a communication distance in a LAN system.

The optical interconnect can be used in connecting devices, boards, and elements in a board. That is, the optical interconnect can be used in transmitting a signal between, for example, the above-mentioned LSIs. Otherwise, in a parallel computer system connecting a plurality of computers or a signal switching circuit of a high-speed router device, the optical interconnect may be used to solve the bottleneck (bandwidth, power consumption, generated heat, size of cable, etc.) of electric wiring technology.

FIG. 1 shows an example of an optical packet switch system using the optical interconnect technology. In this example, the configuration with distribution/selection using semiconductor optical amplifiers (SOA) is shown in FIG. 1. The switch configuration shown in FIG. 1 is a 4×4 switch.

Each input port (#1 through #4) is provided with an optical coupler 1 for distributing an input optical packet signal to output ports (#1 through #4). Each output port (#1 through #4) is provided with semiconductor optical amplifiers 2-1 through 2-4, an optical wavelength multiplexing coupler 3, and a semiconductor optical amplifier (SOA) 4. Each of the semiconductor optical amplifiers 2-1 through 2-4 operates as a gate switch, and passes or rejects an optical packet signal. The optical wavelength multiplexing coupler 3 multiplexes optical packet signals output from the semiconductor optical amplifiers 2-1 through 2-4. The semiconductor optical amplifier 4 amplifies the optical packet signal output from the optical wavelength multiplexing coupler 3 and outputs it. With the above-mentioned two-stage amplification configuration, the reduction of the crosstalk element from an adjacent port and the improvement of an optical SN ratio are realized.

In FIG. 1, the optical packet #1-1 input from the input port (#1), the optical packet #2-1 input from the input port (#2), the optical packet #3-1 input from the input port (#3), and the optical packet #4-1 input from the input port (#4) are sequentially output to the output port (#1).

In the optical packet switch system with the above-mentioned configuration, there can be time difference in optical packet arrival between the input ports. However, in the present technology, the optical buffer element (or a delay element) for holding an optical packet as an optical signal and compensating for the arrival time difference has not practically realized. Therefore, in the existing optical packet switch system, normally the transmission timing of an optical packet is synchronized, and timing of the ON/OFF operation of the semiconductor optical amplifiers 2-1 through 2-4 is adjusted in each output port, thereby realizing switching.

The technique of controlling the output level of a semiconductor optical amplifier is, for example, described in the document 1. In the control method described in the document, the output power of an optical signal light can be maintained at a predetermined level by appropriately adjusting the power of control light applied to a semiconductor optical amplifier.

[Document 1] Ken Morito, "Output-Level Control of Semiconductor Optical Amplifier by External Light Injection", Journal Of Lightwave Technology, Vol. 23, No. 12, December 2005

However, the output power of each transmitter (or light source) for transmitting an optical packet is not the same as that of another transmitter. The loss in the transmission line, and the loss in the connector are not the same as those of each optical path. Therefore, when optical packet signals passing optical gate switches (that is, the semiconductor optical amplifiers 2-1 through 2-4) are multiplexed, by the optical wavelength multiplexing coupler 3, the power level of each optical packet signal can be varied among the input ports. In the example shown in FIG. 2, the power of the optical packet signals #1-1 and #4-1 is large and the power of the optical packet signal #3-1 is small in the output port (#1). In this case, the receiver for receiving the optical packet string (#1-1, #2-1, #3-1, and #4-1) requires a large dynamic range, and it is necessary to provide an expensive or complicated circuit.

SUMMARY OF THE INVENTION

The present invention aims at suppressing the difference in power level of an optical packet signal between the ports in an optical switch system.

The optical switch system according to the present invention has a plurality of input ports and a plurality of output ports, and includes: a plurality of monitor devices for monitoring the power of an optical signal input through corresponding input port; a plurality of optical gate switches for passing or rejecting the optical signal input through corresponding input port; a gate control unit for generating a gate control signal for control of the plurality of optical gate switches; an optical coupler for multiplexing optical signals output from the plurality of optical gate switches; an attenuator for attenuating the optical signal output from the optical coupler; and an attenuation control unit for controlling the amount of attenuation of the attenuator according to a monitor result of the plurality of monitor devices in synchronization with the gate control signal.

The power of an optical signal input to the optical switch system may vary with respect to each input port. The amount of attenuation is determined for each input port. Then, according to the gate control signal selecting an optical signal passing an optical gate switch, the amount of attenuation of the attenuator is controlled. With the configuration, the difference in optical power between the ports is compensated for.

Since optical signals transmitted from a plurality of input ports are multiplexed by the optical coupler, and then lead to the attenuator, it is not necessary to increase the number of attenuators when the number of ports is increased.

According to the present invention, the difference in power level of an optical packet signal among a plurality of ports is suppressed in the optical switch system.

BRIEF DESCRIPTION OF THE DRAWINGS

FIG. 8 is a flowchart of an operation of the attenuation amount calculation unit;

FIG. 9A shows an embodiment of the optical power management table;

FIG. 9B shows an embodiment of an attenuation amount management table;

DESCRIPTION OF THE PREFERRED EMBODIMENTS

Figure 1:
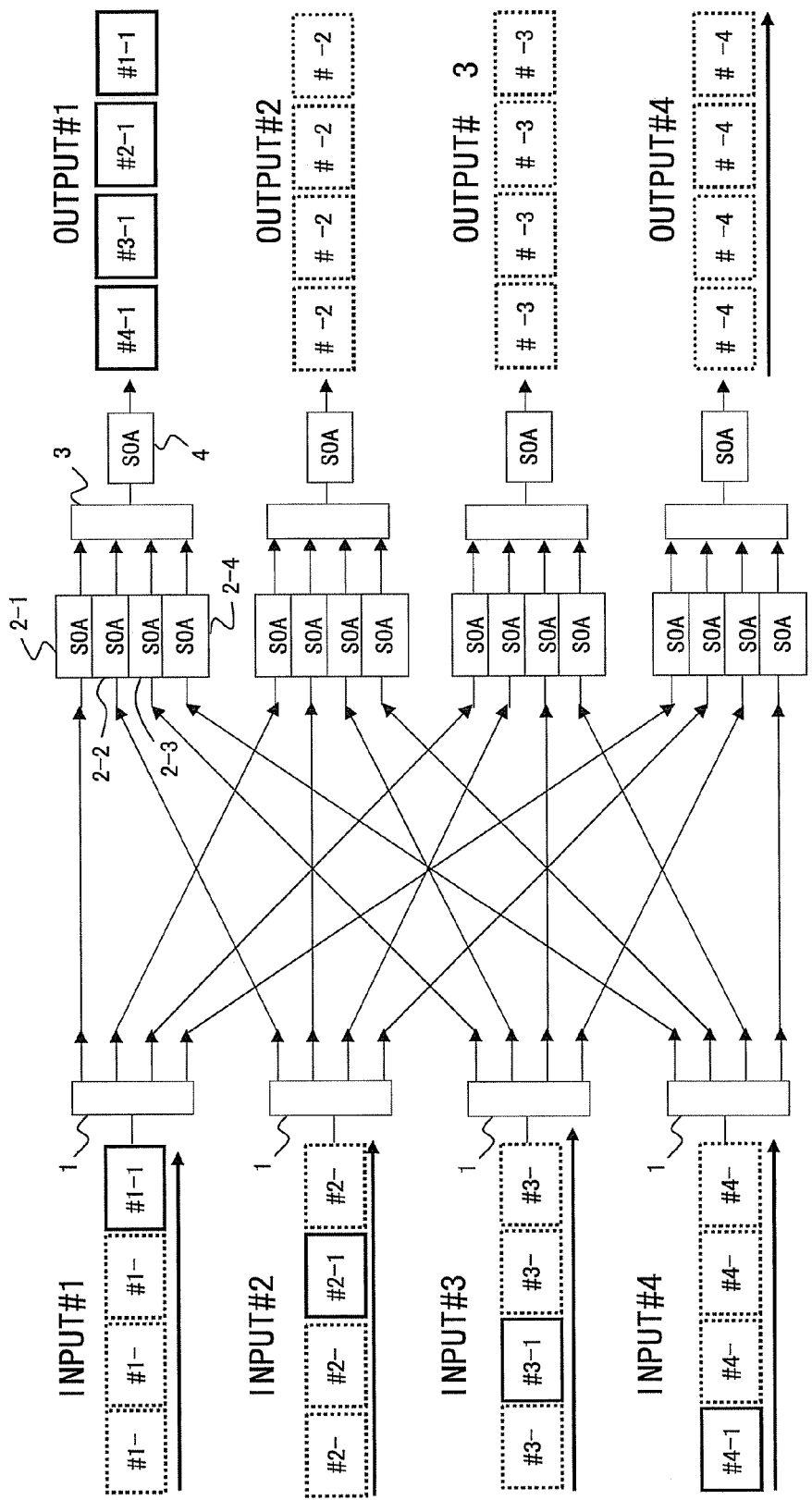
FIG. 1 shows an example of the optical packet switch system using optical interconnect technology.
Figure 2:
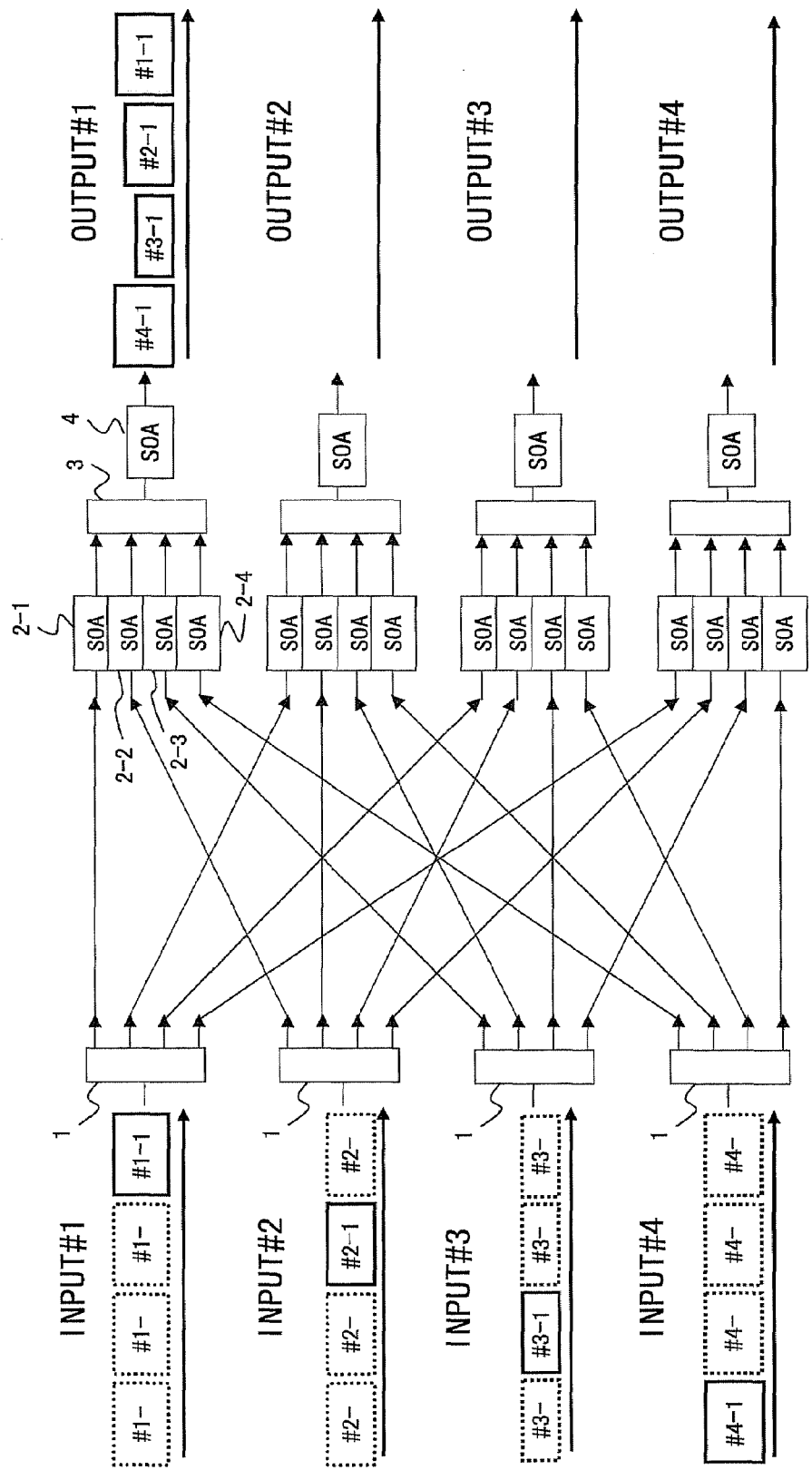
FIG. 2 is an explanatory view explaining the problem of an existing optical packet switch system.
Figure 3:
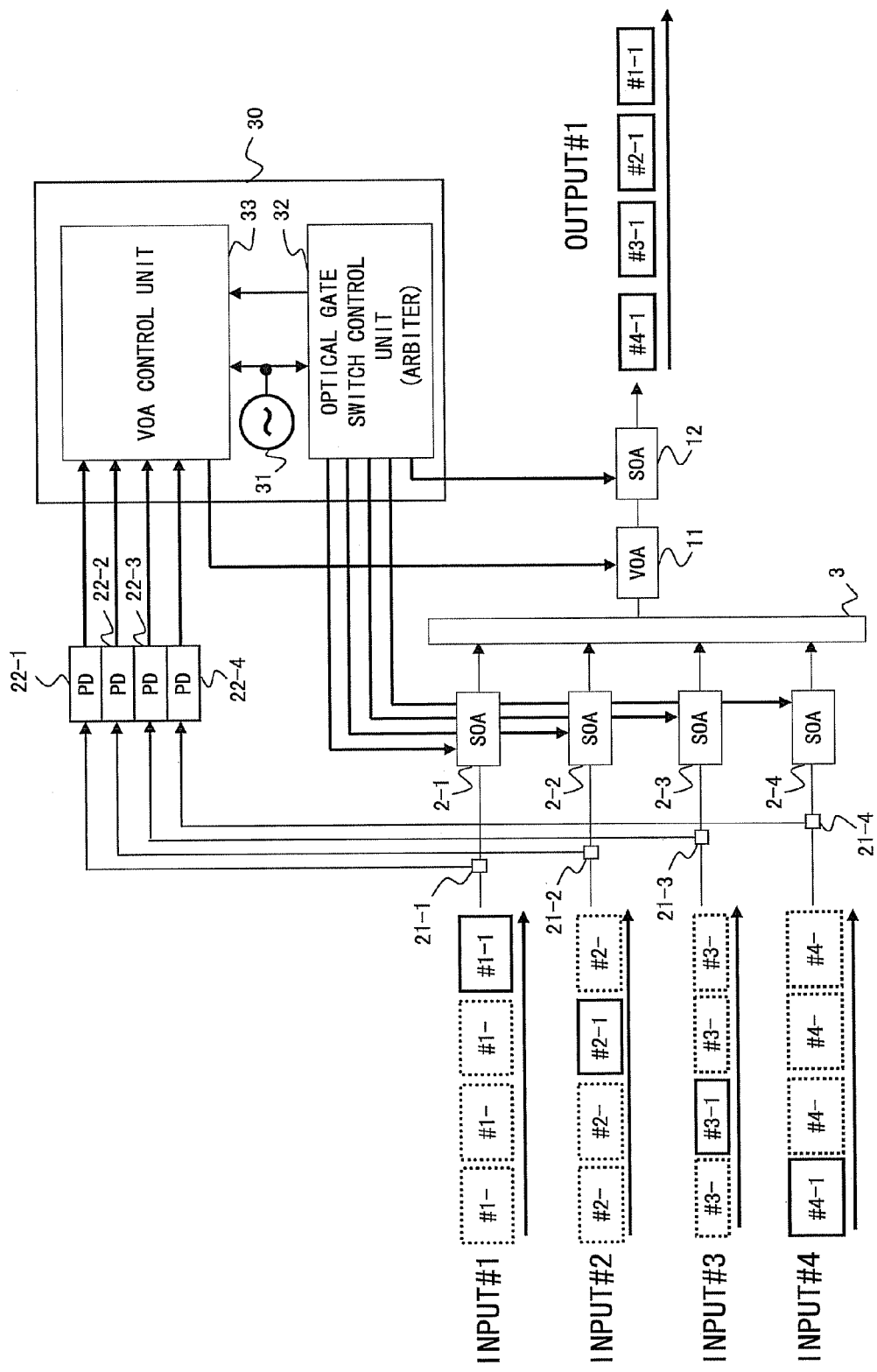
FIG. 3 shows one configuration of an optical packet switch system of the present invention.

FIG. 3 shows the configuration of the optical packet switch system according to one embodiment of the present invention. The basic configuration of the optical packet switch system according to the embodiment is the same as the configuration shown in FIG. 1. However, the optical packet switch system according to the embodiment is different in circuit configuration of each output port from the conventional technology. However, for comprehensibility of the attached drawings, the circuit portion of only one output port (output port (#1) in FIG. 3) is shown here.

Each output port (in this example, the output port (#1)) receives optical signals input through input ports (#1 through #4). Each optical signal is lead to the semiconductor optical amplifiers (SOA) 2-1 through 2-4. Each of the semiconductor optical amplifiers 2-1 through 2-4 operates as a gate switch, and passes or rejects the optical signal transmitted from a corresponding input port (#1 through #4). By the operation of the gate switch, an optical packet signal is extracted from the optical signal. The optical wavelength multiplexing coupler 3 multiplexes the optical packet signals output from the semiconductor optical amplifiers 2-1 through 2-4.

A variable optical attenuator (VOA) 11 attenuates the optical packet signal output from the optical wavelength multiplexing coupler 3 based on an instruction from a VOA control unit 33. At this time, the amount of attenuation of the variable optical attenuator 11 is controlled for each optical packet. An optical amplifier (SOA) 12 amplifies the optical packet signal output from the variable optical attenuator 11, and then outputs it.

Optical couplers 21-1 through 21-4 branch the optical signals transmitted from the input port (#1 through #4) and lead them to photodetectors (PD) 22-1 through 22-4, respectively. The photodetectors 22-1 through 22-4 are, for example, photodiodes, and convert an optical signal into an electrical signal. That is, a current proportional to the power of an optical signal is generated. However, a photodiode capable of converting an optical signal having a very high bit rate (for example, several gigabits/sec.) is very expensive, and it is not practical with the cost of an optical packet switch system taken into account. Therefore, in this embodiment, the photodetectors 22-1 through 22-4 are photodiodes with relatively narrow bands (response speeds) and monitor the average power of optical signals.

A switch control unit 30 comprises a reference clock source 31, an optical gate switch control unit 32, and a VOA control unit 33, and controls the switching operation of the optical packet switch system. The reference clock source 31 generates a reference clock for use by the optical packet switch system. Only one reference clock source 31 is provided for the optical packet switch system.

The optical gate switch control unit 32 arbitrates transmission requests from optical signal transmitters connected to corresponding input port (#1 through #4) for each output port. Then, the optical gate switch control unit 32 provides an arbitration result for the VOA control unit 33, and generates a gate control signal for control of the semiconductor optical amplifiers 2-1 through 2-4 based on the arbitration result. The gate control signal is used for control of a gain of the semiconductor optical amplifiers 2-1 through 2-4. That is, the semiconductor optical amplifiers 2-1 through 2-4 controls the ON/OFF status according to the gate control signal. The configuration and operation of the optical gate switch control unit 32 are described later in detail. Only one optical gate switch control unit 32 is provided for the optical packet switch system, and arbitrates all output port (#1 through #4).

The VOA control unit 33 controls the amount of attenuation of the variable optical attenuator 11 based on the power of each optical signal obtained from the photodetectors 22-1 through 22-4. At this time, the amount of attenuation corresponding to the optical signal input through an input port (#1) is determined based on the monitor result by the photodetector 22-1. Similarly, the amount of attenuation corresponding to the optical signal input through the input port (#2 through #4) is determined based on the monitor result by the photodetectors 22-2 through 22-4, respectively. Then, in synchronization with the gate control signal for control of the semiconductor optical amplifiers 2-1 through 2-4, the amount of attenuation of the variable optical attenuator 11 is switched. The configuration and the operation of the VOA control unit 33 are described later in detail. The VOA control unit 33 is provided for each output port.

Described below are the practical configuration and operation of the optical packet switch system according to one embodiment of the present invention.

Figure 4:
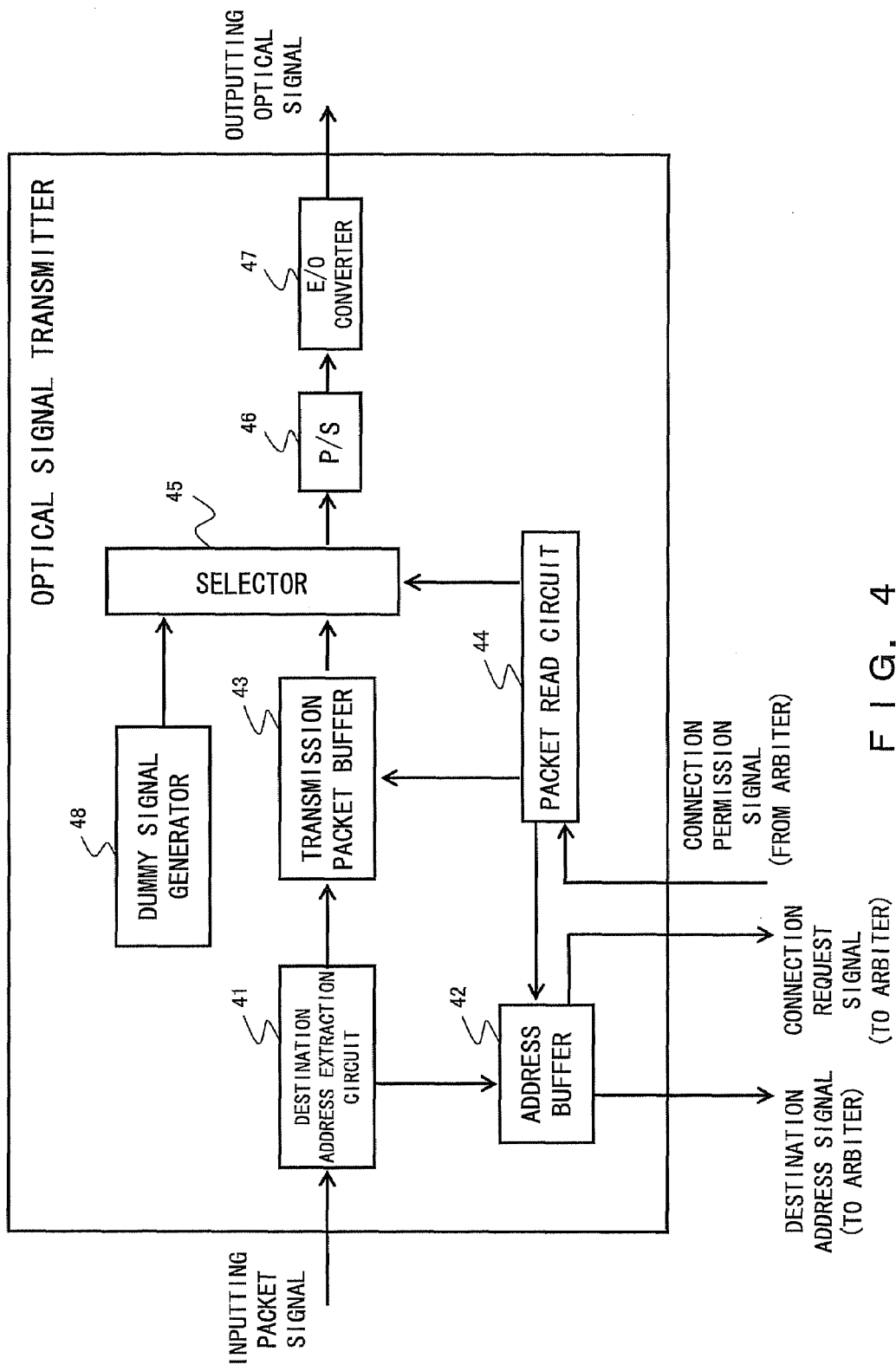
FIG. 4 shows a configuration of an optical signal transmitter connected to an input port.

FIG. 4 shows the configuration of the optical signal transmitter connected to each input port of the optical packet switch system. The optical signal transmitter transmits an optical packet signal. However, it transmits an optical dummy signal when an optical packet signal is not transmitted. The optical signal transmitter receives a packet to which a destination address is added.

A destination address extraction circuit 41 extracts a destination address of an input packet signal, and writes it to an address buffer circuit 42. At this time, the packet signal is stored in a transmission packet buffer 43. When the destination address of an input packet signal is written, the address buffer circuit 42 transmits a connection request signal and a destination address signal to the optical gate switch control unit (arbiter) 32. The optical gate switch control unit (arbiter) 32 arbitrates the connection requests (transmission requests) from a plurality of optical signal transmitters.

Upon receipt of a connection permission signal from the optical gate switch control unit (arbiter) 32, a packet read circuit 44 reads a corresponding packet from the transmission packet buffer 43, and allows a selector 45 to select the packet signal. A parallel/serial converter 46 converts a packet signal selected by the selector 45 into serial data. An E/O converter 47 converts a packet signal into an optical signal (optical packet signal) and outputs it. A destination address stored in the address buffer circuit 42 is cleared when a connection permission signal is received.

When a connection permission signal is not obtained, the packet read circuit 44 controls the selector 45 to select a dummy signal generated by a dummy signal generator 48. At this time, the E/O converter 47 outputs an optical signal (optical dummy signal) corresponding to the dummy signal. The dummy signal is, for example, a packet including a data string indicating a dummy. In addition, when the connection permission signal is not obtained, the address buffer circuit 42 holds a destination address as is, and the transmission packet buffer 43 holds a packet signal as is.

Thus, the optical signal transmitter transmits an optical packet signal when it receives a connection permission, and transmits an optical dummy signal when it does not transmit an optical packet signal. The dummy signal is a data string generated such that the optical intensity and mark rate of the optical dummy signal can be the same as the optical intensity and mark rate of an optical packet signal. Therefore, the average power of optical packet signals and the average power of optical dummy signals are substantially the same. That is, the average power of the optical signal of the optical transmitter is substantially constant. In other words, the average power of an optical signal provided for each input port of the optical packet switch system is substantially constant.

Figure 5:
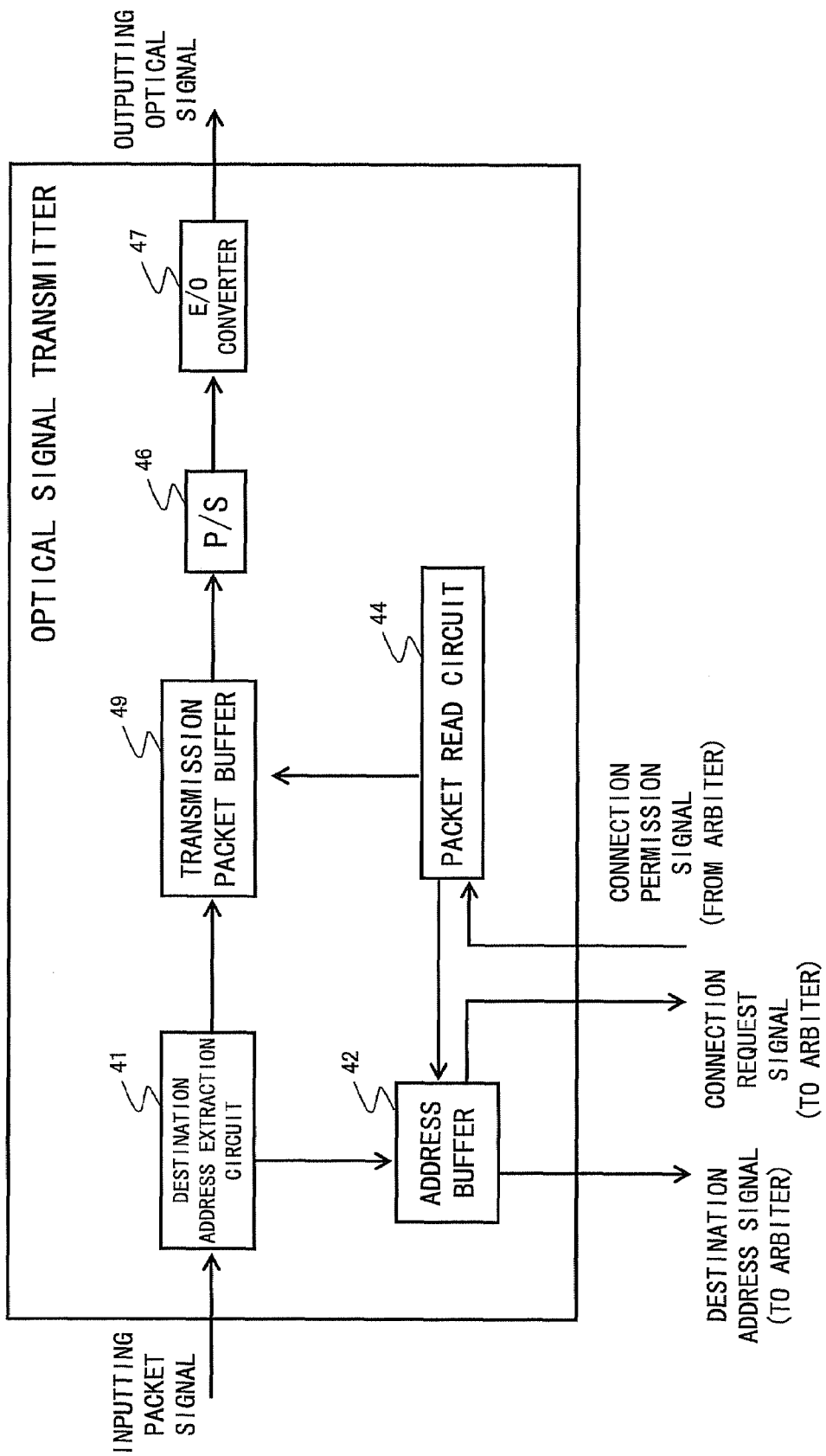
FIG. 5 shows an example of a variation of an optical signal transmitter.

The optical signal transmitter is not limited to the configuration shown in FIG. 4. That is, for example, as shown in FIG. 5, a transmission packet buffer 49 can have the roles of both the selector 45 and the dummy signal generator 48. In this case, a dummy signal is stored in advance in a predetermined area of the transmission packet buffer 49. The packet read circuit 44 reads a packet signal when it receives a connection permission signal, and reads the dummy signal when it cannot receive the connection permission signal.

Figure 6:
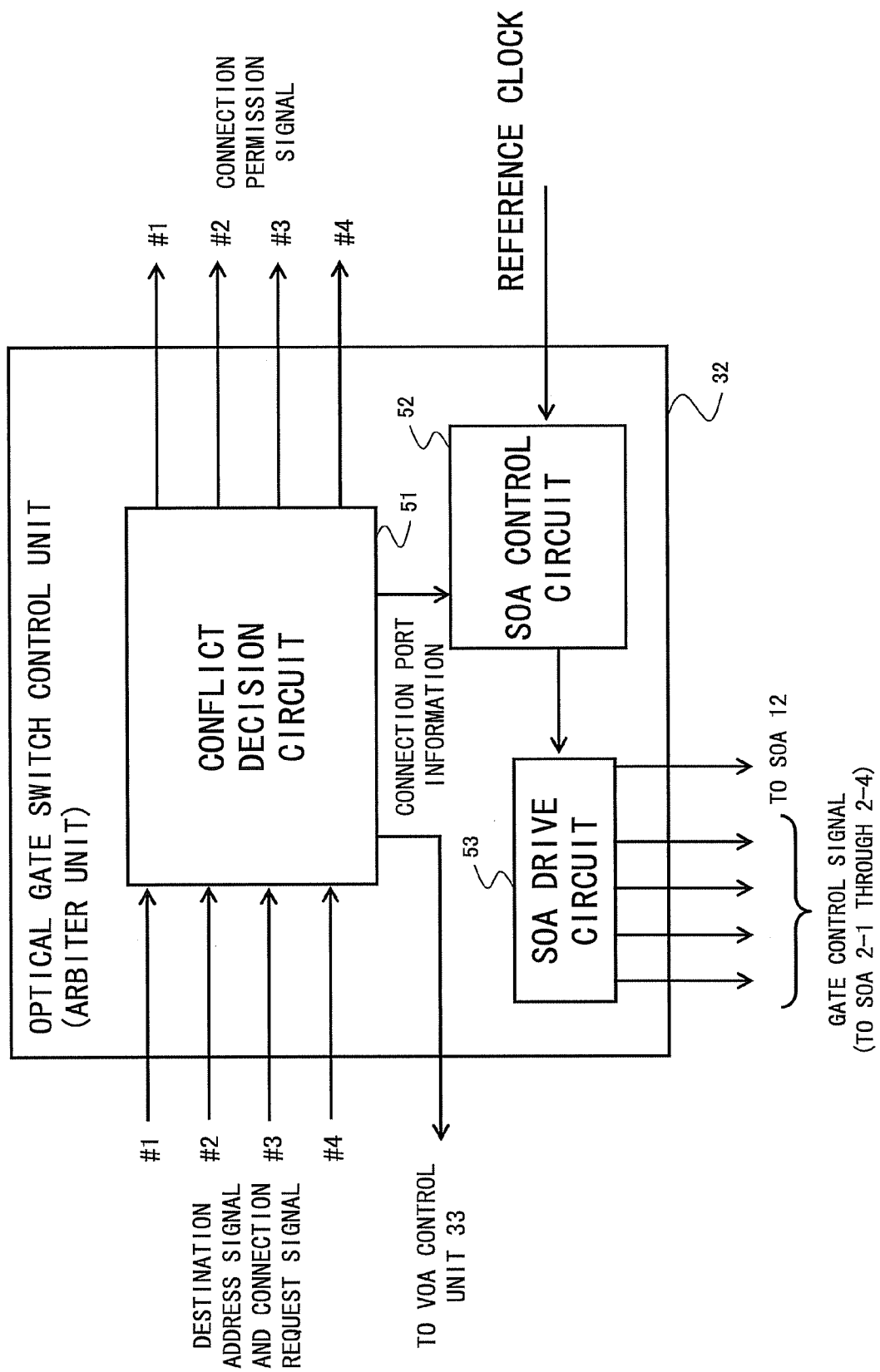
FIG. 6 shows a configuration of the optical gate switch control unit.

FIG. 6 shows the configuration of the optical gate switch control unit 32. In FIG. 6, a conflict decision circuit 51 receives a connection request and a destination address transmitted from an optical signal transmitter through a corresponding input port, and arbitrates connection requests. A conflict decision is performed for each destination address (output port). That is, when the conflict decision circuit 51 receives the connection requests having the same destination address in the same time slot from a plurality of input ports, it selects one of the input ports to give a connection permission to the selected input port. A "time slot" refers to a time period assigned to one optical packet in this embodiment. An arbitration algorithm is not specifically limited. However, for example, the arbitration is performed such that each input port can be equally selected. When only one connection request is received in a time slot, a connection permission is assigned to the connection request. When no connection request is received from any optical signal transmitter in a time slot, the conflict decision circuit 51 may direct an optical dummy signal to a corresponding output port.

The conflict decision circuit 51 notifies a SOA control circuit 52 and the VOA control unit 33 of connection port information indicating a result of the arbitration. The connection port information identifies an input port selected by the arbitration.

The SOA control circuit 52 uses the reference clock generated by the reference clock source 31, and controls a SOA drive circuit 53 according to the connection port information. The SOA drive circuit 53 generates a gate control signal according to the connection port information, and drives the semiconductor optical amplifiers 2-1 through 2-4. That is, the SOA drive circuit 53 controls the gain of the semiconductor optical amplifiers 2-1 through 2-4 according to the connection port information, and controls the ON/OFF (pass/reject) status of the semiconductor optical amplifiers 2-1 through 2-4. For example, when the connection port information indicates "#1", the semiconductor optical amplifier 2-1 is controlled to be placed in the ON (passing) status, and the semiconductor optical amplifiers 2-2 through 2-4 are controlled to be placed in the OFF (reject) status. In this case, an optical packet signal input through the input port (#1) is extracted, and optical signals input through the input port (#2 through #4) are respectively rejected. The SOA control circuit 52 also controls the semiconductor optical amplifier 12 in synchronization with the gate control signal.

Thus, the optical gate switch control unit 32 arbitrates the input ports for each time slot. Then the optical gate switch control unit 32 notifies the VOA control unit 33 of a selected input port, and controls the semiconductor optical amplifiers 2-1 through 2-4 such that an optical signal input only through the selected input port can be output.

Figure 7:
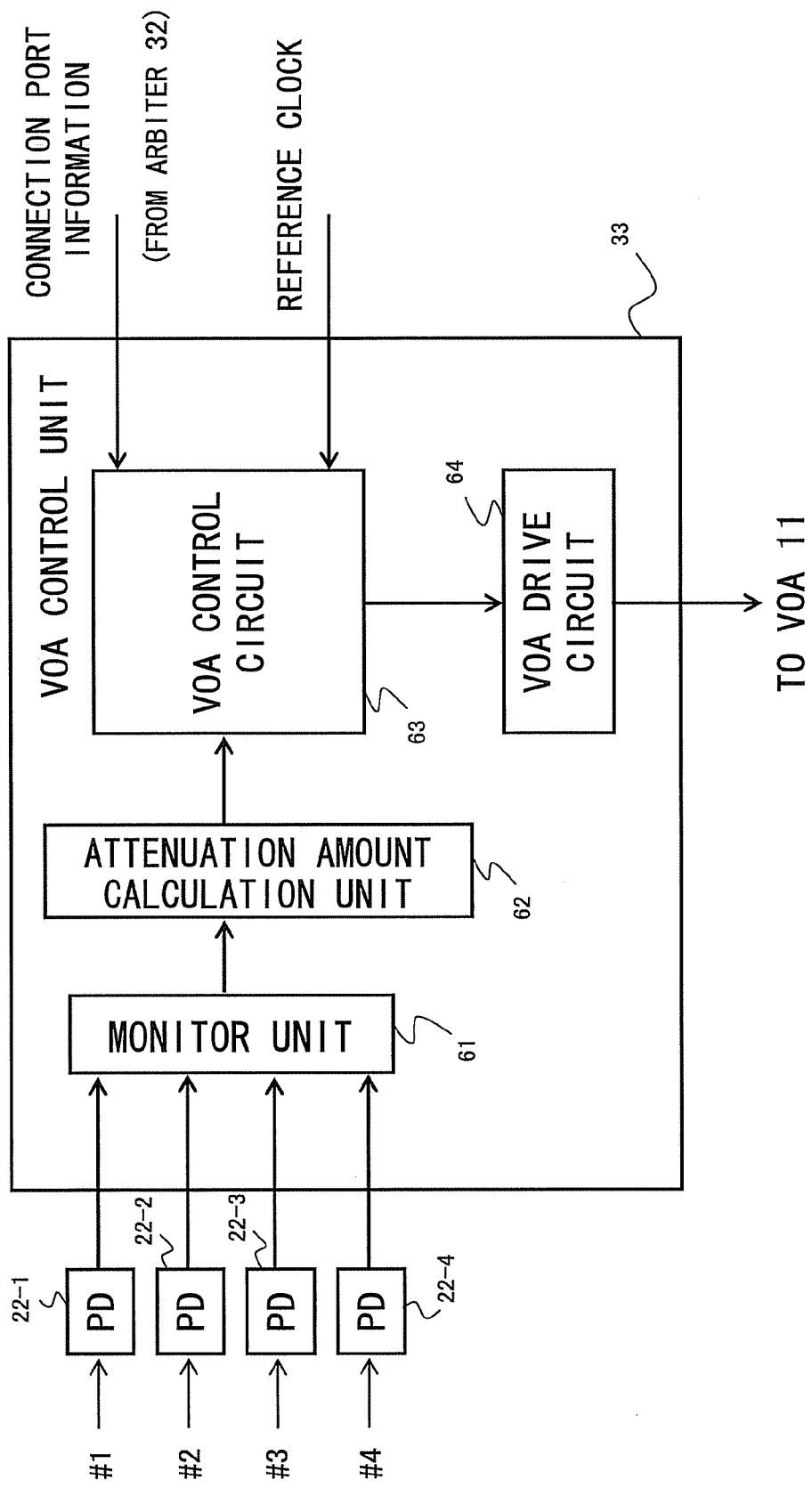
FIG. 7 shows a configuration of the VOA control unit.

FIG. 7 shows the configuration of the VOA control unit 33. In FIG. 7, a monitor unit 61 monitors the power of an optical signal transmitted from the input port (#1 through #4) according to the output signals of the photodetectors 22-1 through 22-4. The power of the optical signal transmitted from each input port is substantially constant. The monitor unit 61 monitors the average power of the optical signal transmitted from each input port.

An attenuation amount calculation unit 62 calculates the amount of attenuation of the variable optical attenuator 11 for each input port based on the monitor result by the monitor unit 61. An example of an operation of the attenuation amount calculation unit 62 is explained by referring to the flowchart shown in FIG. 8. The process according to the flowchart is performed repeatedly at, for example, predetermined time intervals.

In step S1, the optical power of each input port (#1 through #4) is obtained. The optical power of each input port (#1 through #4) is detected by the monitor unit 61, and written to the optical power management table shown in FIG. 9A. In this case, it is assumed that the optical power management table is periodically updated. It is also possible to directly read output data of the monitor unit 61 without providing an optical power management table. In step S2, the minimum power is detected from the optical power of the input port (#1 through #4). In the embodiment shown in FIG. 9A, the optical power of the input port (#3) is the minimum.

In step S3, the difference between the input power of each input port (#1 through #4) and the minimum power obtained in step S2 is calculated. Then, in step S4, the calculation result in step S3 is written as amount of attenuation data to the attenuation amount management table shown in FIG. 9B.

Thus, the attenuation amount calculation unit 62 calculates the amount of attenuation corresponding to each of the input ports (#1 through #4).

In the embodiment shown in FIGS. 8, 9A, and 9B, the amount of attenuation is calculated using the minimum power in the optical power of the input ports (#1 through #4) as a reference. However, the present invention is not limited to this application. That is, for example, the amount of attenuation can be calculated using a predetermined reference power. In this case, based on the difference between the input power of each input port (#1 through #4) and the reference power, the amount of attenuation corresponding to each input port (#1 through #4) is calculated.

A VOA control circuit 63 controls a VOA drive circuit 64 based on the connection port information provided by the optical gate switch control unit 32 and the attenuation amount data obtained by the attenuation amount calculation unit 62. At this time, the control timing is based on the reference clock. A practical operation of the VOA control circuit 63 is described below. That is, the VOA control circuit 63 extracts the attenuation amount data corresponding to the port number (#1 through #4) indicated by the connection port information from the attenuation amount management table shown in FIG. 9B. Then, it controls the VOA drive circuit 64 according to the extracted attenuation amount data.

The VOA drive circuit 64 drives the variable optical attenuator 11 under the control of the VOA control circuit 63. When the amount of attenuation of the variable optical attenuator 11 changes with an applied voltage, the VOA drive circuit 64 applies a voltage corresponding to the instruction from the VOA control circuit 63 to the variable optical attenuator 11. Thus, the amount of attenuation of the variable optical attenuator 11 is controlled.

As described above, the VOA control unit 33 generates attenuation amount data corresponding to the connection port information applied from the optical gate switch control unit 32, and controls the amount of attenuation of the variable optical attenuator 11 using the attenuation amount data. The connection port information identifies an input port to be selected, and the information is generated for each time slot. Therefore, the amount of attenuation of the variable optical attenuator 11 is controlled for each time slot. The semiconductor optical amplifiers 2-1 through 2-4 operating as optical gate switches pass only an optical signal input through the input port identified by the connection port information. Therefore, the variable optical attenuator 11 attenuates an optical signal with the amount of attenuation corresponding to the input port.

Figure 10:
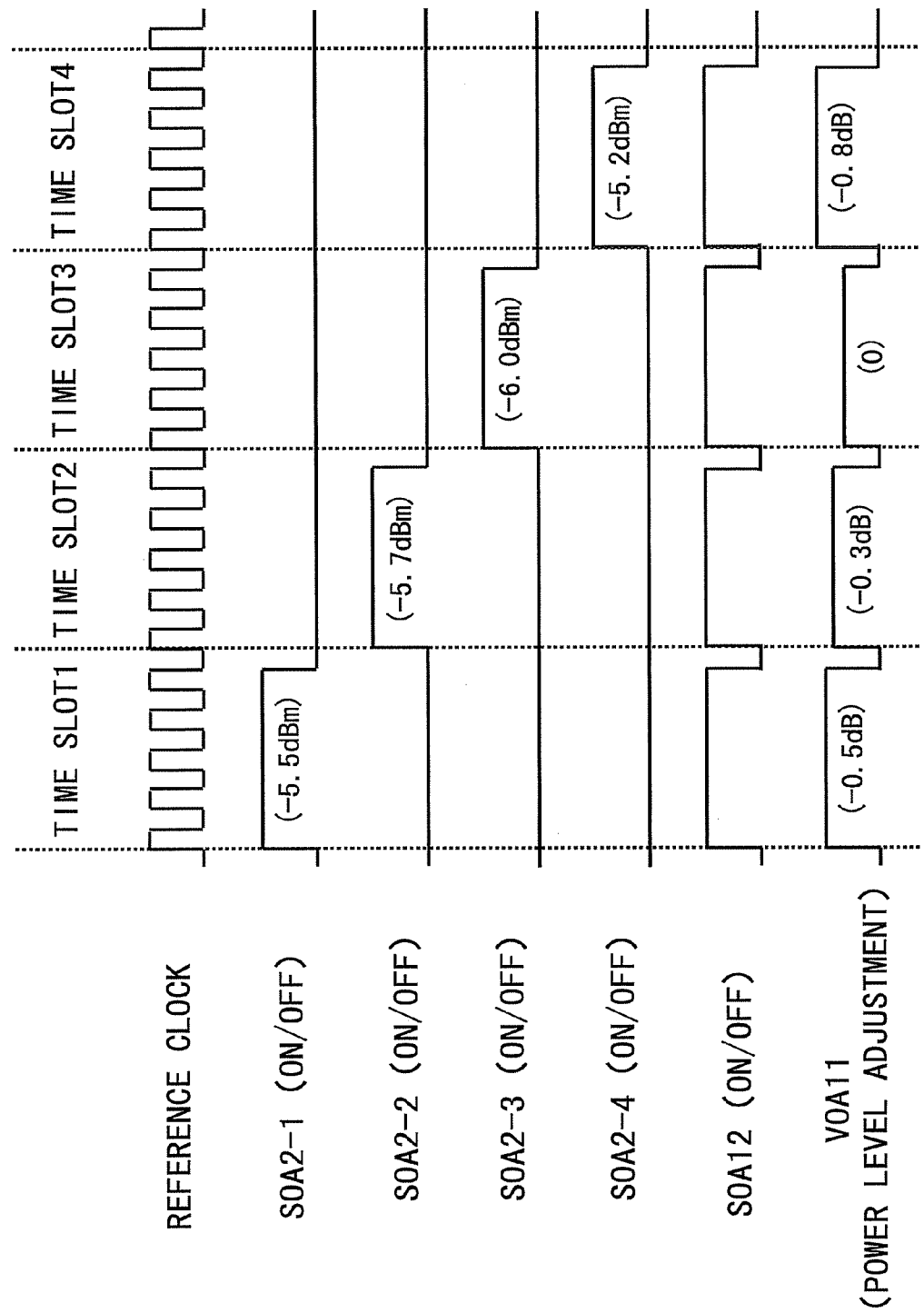
FIG. 10 is a timing chart for explaining an operation of the optical packet switch system according to one embodiment of the present invention.

FIG. 10 is a timing chart for explaining the operation of the optical packet switch system according to the embodiment. In this example, as a result of the arbitration by the optical gate switch control unit 32, it is assumed that input ports 1 through input port 4 are sequentially selected during time slot 1 through 4. Additionally, the operation of an optical packet switch system is based on the reference clock.

In the time slot 1, the optical gate switch control unit 32 generates a gate control signal to control the semiconductor optical amplifier 2-1 to be placed in the ON status and the semiconductor optical amplifiers 2-2 through 2-4 to be placed in the OFF status. By so doing, an optical signal transmitted from the input port (#1) is selected, and provided for the variable optical attenuator 11 through the optical wavelength multiplexing coupler 3. The power of the optical signal is "−5.5 dBm" in the embodiment shown in FIG. 9A. The VOA control unit 33 provides a voltage for generating an "amount of attenuation" corresponding to the input port (#1) for the variable optical attenuator 11 in synchronization with the generation of the gate control signal. According to the embodiment shown in FIG. 9B, the voltage corresponding to the "amount of attenuation=0.5 dB" is provided for the variable optical attenuator 11. Accordingly, the power of the optical signal output from the variable optical attenuator 11 is "−6.0 dBm". Here, optical loss in the system, etc. is ignored for simple explanation.

Then, in the time slot 2, a gate control signal for controlling the semiconductor optical amplifier 2-2 to be placed in the ON status, and the semiconductor optical amplifiers 2-1, 2-3, and 2-4 to be placed in the OFF status is generated, and an optical signal transmitted from the input port (#2) is selected. The power of the optical signal is "−5.7 dBm" in the embodiment shown in FIG. 9A. In synchronization with the generation of the gate control signal, the voltage for generating the "amount of attenuation" corresponding to the input port (#2) is applied to the variable optical attenuator 11. In the embodiment shown in FIG. 9B, the "amount of attenuation=0.3 dB". In this case, the power of the optical signal output from the variable optical attenuator 11 is also "−6.0 dBm".

In the subsequent time slots, each amount of attenuation of the variable optical attenuator 11 is controlled, and the power of each optical packet signal output from it is held substantially identical. However, in the embodiment, a guard time is set among the time slots. The guard time is an extinction period to avoid the interference of an optical signal between the adjacent time slots.

As described above, in the optical packet switch system according to the embodiment of the present invention, the power difference between the ports of optical packet signals is compensated for. That is, the power of the optical packet signal output through each output port of the optical packet switch system is maintained constant, respectively. Therefore, the receiver for receiving an optical packet output from the optical packet switch system can reserve good reception quality without a wide dynamic range.

With the configuration shown in FIG. 3, the variable optical attenuator 11 is provided at a stage after the optical wavelength multiplexing coupler 3 for multiplexing the optical signals from a plurality of input ports (#1 through #4), and the amount of attenuation of the variable optical attenuator 11 is controlled for each time slot. Therefore, although the number of ports increases, only one variable optical attenuator is required. Therefore, the optical packet switch system can be easily expanded or realized in a large scale.

Furthermore, since the semiconductor optical amplifier 12 is provided at a stage after the variable optical attenuator 11, the input power of the semiconductor optical amplifier 12 can be optimized by controlling the variable optical attenuator <Variation>

Figure 11:
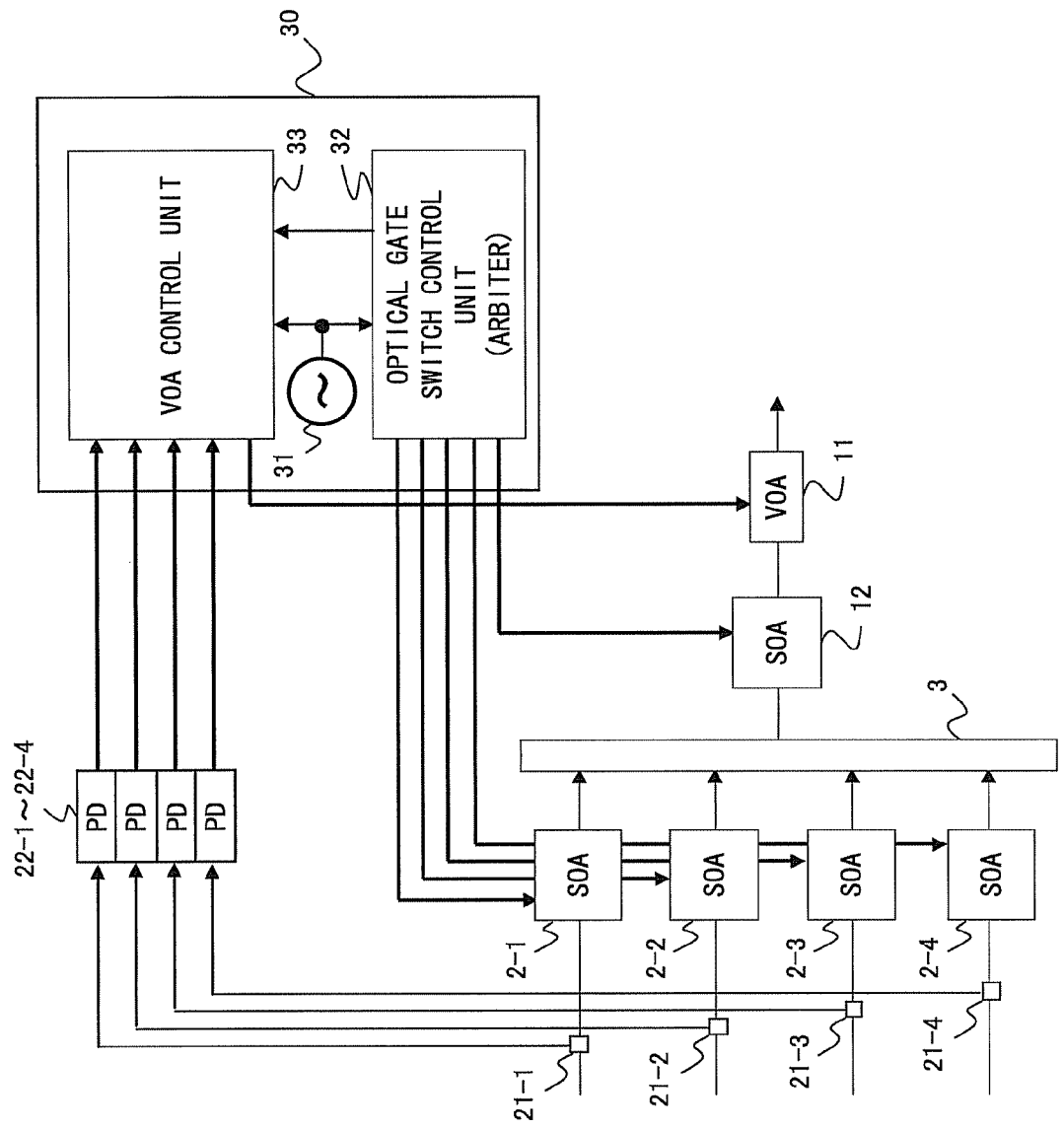
FIG. 11 shows a variation of the optical packet switch system according to one embodiment of the present invention.

In the above-mentioned embodiment, the semiconductor optical amplifier 12 is provided at a stage after the variable optical attenuator 11. However, the present invention is not limited to that configuration. That is, as shown in FIG. 11, the semiconductor optical amplifier 12 can be provided at a stage before the variable optical attenuator 11. With the configuration, the output power of the semiconductor optical amplifier 12 (that is, the output power of the optical packet switch system) can be adjusted by controlling the variable optical attenuator 11.

In the above-mentioned embodiment, the optical packet switch system for switching the paths of optical packets, but the present invention is not limited to this configuration. That is, the present invention can be widely applied to an optical switch for switching the paths of an optical signal.

Furthermore, in the above-mentioned embodiment, the amount of attenuation of the variable optical attenuator 11 can be controlled to compensate for the difference in power between the ports, but the present invention is not limited to this configuration. That is, the present invention includes the configuration of controlling the power of the optical signal output from the optical wavelength multiplexing coupler 3 for each time slot in synchronization with a gate control signal. Therefore, for example, the power difference between the ports can be compensated for by controlling the gain of an optical amplifier (semiconductor optical amplifier 12 in FIG. 3). However, when the characteristic of optical devices which have already been commercially realized is taken into account, the configuration of controlling the amount of attenuation is preferable.

Furthermore, the present invention is not applied only to an optical switch for switching the paths of optical signals, but can also be applied to an optical TDM device for time-multiplexing optical signals input through a plurality of input ports and outputting the multiplexed signal through an output port.

What is claimed is:

1. An optical switch system having a plurality of input ports and a plurality of output ports, comprising:
    a plurality of monitor devices monitoring power of an optical signal input through corresponding input port;
    a plurality of optical gate switches passing or rejecting the optical signal input through corresponding input port;
    a gate control unit generating a gate control signal for controlling said plurality of optical gate switches;
    an optical coupler multiplexing optical signals output from said plurality of optical gate switches in a time-division multiplexing method;
    an attenuator attenuating the time-division multiplexed optical signal output from said optical coupler; and
    an attenuation control unit controlling an amount of attenuation of said attenuator according to a monitor result of said plurality of monitor devices in synchronization with the gate control signal.

2. The optical switch system according to claim 1, wherein p1 power of an optical signal input through each input port is controlled to be substantially constant, respectively.

3. The optical switch system according to claim 1, wherein:
    said plurality of optical gate switches are semiconductor optical amplifiers; and
    the gate control signal controls a gain of a corresponding semiconductor optical amplifier to pass or reject an optical signal.

4. The optical switch system according to claim 1, further comprising
    an optical amplifier at a stage after said attenuator.

5. The optical switch system according to claim 1, further comprising
    an optical amplifier between said optical coupler and said attenuator.

6. The optical switch system according to claim 1, wherein said gate control unit comprises:
    an arbitration circuit arbitrating, for each output port, transmission requests from optical signal transmitters connected to each input port; and
    a drive circuit generating the gate control signal according to an arbitration result by said arbitration circuit.

7. The optical switch system according to claim 6, wherein said attenuation control unit controls the amount of attenuation of said attenuator according to the arbitration result of said arbitration circuit and monitor results of said plurality of monitor devices.

8. The optical switch system according to claim 1, wherein said attenuation control unit determines an amount of attenuation for an optical signal input through each input port based on a difference between each power value obtained by said plurality of monitor devices and the minimum power value obtained by said plurality of monitor devices.

9. The optical switch system according to claim 1, wherein said attenuation control unit determines an amount of attenuation for an optical signal input through each input port based on a difference between each power value obtained by the plurality of monitor devices and a predetermined reference power value.

10. An optical switch system having a plurality of input ports and a plurality of output ports, comprising:
    a plurality of monitor devices monitoring power of an optical signal input through corresponding input port;
    a plurality of optical gate switches passing or rejecting the optical signal input through corresponding input port;
    a gate control unit generating a gate control signal for controlling said plurality of optical gate switches;
    an optical multiplexer multiplexing optical signals output from said plurality of optical gate switches in a time-division multiplexing method; and
    a power adjustment unit adjusting power of time-division multiplexed optical signal output from said optical multiplexer according to a monitor result of said plurality of monitor devices in synchronization with the gate control signal.

* * * * *

UNITED STATES PATENT AND TRADEMARK OFFICE
CERTIFICATE OF CORRECTION

PATENT NO. : 7,672,585 B2
APPLICATION NO. : 11/536326
DATED : March 2, 2010
INVENTOR(S) : Kyosuke Sone It is certified that error appears in the above-identified patent and that said Letters Patent is hereby corrected as shown below:

Column 9, Line 42, before "power" delete "p1".

Signed and Sealed this

Twenty-fifth Day of May, 2010

David J. Kappos
*Director of the United States Patent and Trademark Office*